Dec. 24, 1957     C. D. TUCKER     2,817,260

TURRET TOOL POSTS

Filed June 21, 1954

*INVENTOR.*
CHARLES D. TUCKER
BY
*E. F. Salter*

2,817,260
TURRET TOOL POSTS

Charles D. Tucker, Cochranton, Pa., assignor to Mc-Crosky Tool Corporation, Meadville, Pa., a corporation of Pennsylvania Application June 21, 1954, Serial No. 437,933

5 Claims. (Cl. 82—36)

This invention relates to a tool holder and more particularly to a tool holder of the turret type for lathes or the like in which a number of cutting tools or metal working instrumentalities may be clamped, readily selected and presented to work performing positions.

Such a tool holder is disclosed in United States Patent No. 2,353,115 and it has proven satisfactory in service. However, owing to the tendency in industry to increase the loads on the machinery and equipment employed, further developments in the tool holder art have been indicated, particularly as to the locking of the tool turrett in selected positions.

The primary object of this invention is to securely lock the tool turret of a tool holder in a selected position about the column of a tool holder while at the same time enabling the user to rapidly unlock the tool turret for indexing its position on the column.

A further object of the invention is to provide adequate strength and rigidity to the cooperating parts and especially the locking instrumentalities under the substantial power and load increases in present day practices.

Another object of the invention is the provision of an adequate locking structure which can readily be installed on many types of turret heads now on the market without the necessity of making radical changes in the design of the turret body, column or other major parts.

The above and other objects may be attained by employing this invention which includes among its features an internally screw threaded member rotatably connected to the turret body of a tool holder of the type above referred to and threadedly engaging the column thereof, lugs and associated slotted parts of the member in embracing relation to the column, and a handle carried by the member for movement in an arcuate path and operatively connected to the lugs and associated parts of the member for moving them into and out of clamping engagement with the column.

Other features include means carried by the lugs and operatively connected to the handle for regulating the pressure of the lugs and associated parts of the member on the column and means carried by the lugs and engaging the regulating means for holding said regulating means in a selected position.

Figure 1:
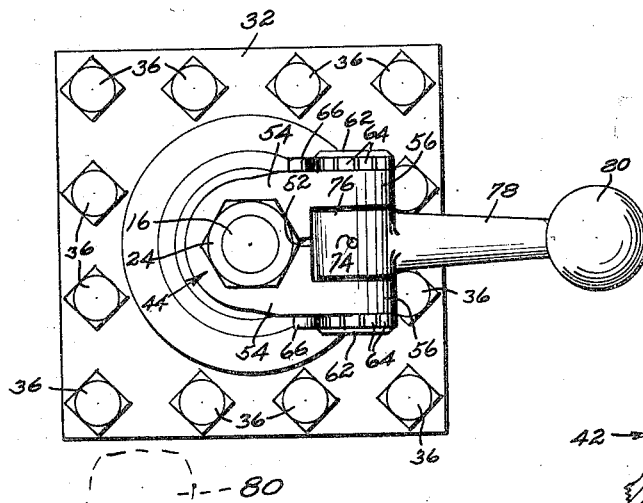
Figure 1 is a top plan view of a turret type tool holder embodying the features of this invention.

With continued reference to the drawings, a machine bed 10 is provided with a conventional inverted T-slot or groove 12 in which is received the head 14 of a center bolt 16 which extends upwardly above the bed 10 and is threaded adjacent its upper end. A column 18 encompasses the bolt 16 for the better part of its length and is provided with an outwardly extending base 20, which rests on the bed 10, and carries an annular series of circumferentially spaced teeth or keys 22. A nut 24, threaded on the bolt 16, engages the upper end of the column 18 to clamp it in position on the bed 10, as will be readily understood by reference to Figure 2. Relatively coarse external screw threads 26 of fast lead are carried by the column 18 adjacent the upper end thereof for a purpose to be more fully hereinafter described.

Mounted on the column 18 in encircling relation thereto is a turret body designated generally 28 which comprises a barrel 30 which encompasses the column 18 and carries, adjacent its upper and lower ends, the outwardly extending flanges 32 and 34 defining between them channels in which the shanks or bodies of cutting or boring tools (not shown) are received and clamped by set screws 36 in the usual manner. Formed in the lower end of the barrel 30 is an annular recess 38 for the reception of the base 20 of the column 18 and carried by the barrel 30 and extending into the recess 38 is an annular series of inwardly extending circumferentially spaced teeth or keys which mesh with the teeth 22 formed in the base 20 of the column 18, thus serving to hold the turret 28 in a selected or indexed position about the axis of the column. The structure so far described is conventional and forms no part of this invention except in combination with the structure now to be described.

Figure 2:
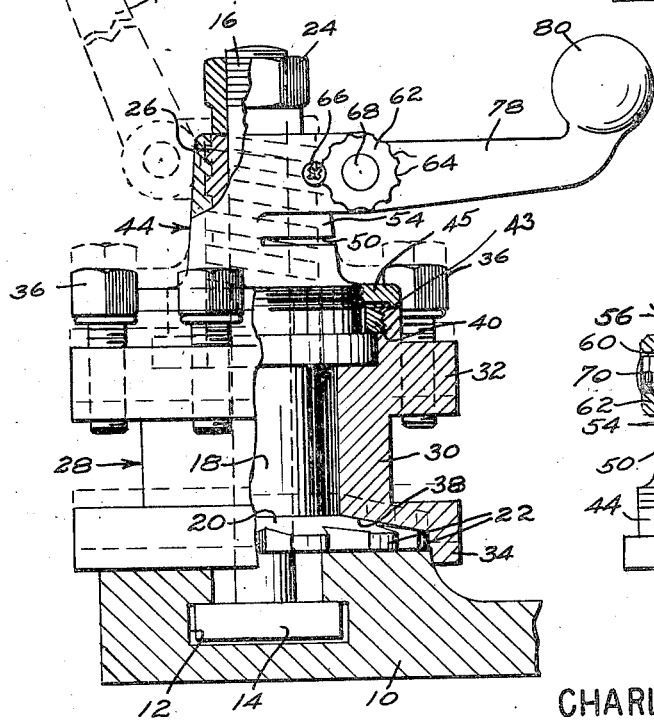
Figure 2 is a side view, partly in section, of the tool holder illustrated in Figure 1 and showing it mounted on a support.
Figure 4:
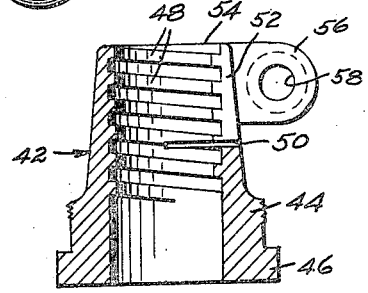
Figure 4 is a sectional view taken substantially on the line 4—4 of Figure 3 with the handle and handle shaft removed.
Figure 3:
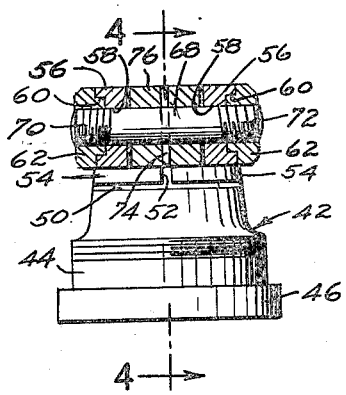
Figure 3 is a side view of the slotted member showing portions thereof in section.

A member, generally designated 42, is rotatably connected to the upper end of the turret body 28. This member may be fashioned from a ductile iron casting which will provide high tensile strength and resiliency. The rotatable connection between the member 42 and the turret body 28 is accomplished by counterboring the upper end of the turret body and internally threading the same as at 43 to receive a complementary threaded retaining ring 40. The member 42 comprises a tubular body 44 carrying adjacent its lower end an outwardly extending annular flange 46, the upper surface of which contacts the bottom surface of the retaining ring 40. Thus, a rotative connection is established between the member 42 and turret body 28, restraining however any relative longitudinal movement between these parts. A dust collar 45 threaded on the column protects the rotatable connection between the column and turret body and other internal surfaces. Carried by the member 42 adjacent its upper end are relatively coarse internal screw threads 48, preferably of fast lead, which mesh with the threads 26 on the column 18 so that as the member is rotated about the axis of the column 18 it will progress longitudinally thereon to move the internal teeth in the recess 38 into and out of mesh with the teeth 22 in the conventional manner. Formed in the member 42 intermediate the upper and lower ends thereof is a transversely extending slot 50 and extending upwardly through the member substantially midway between the opposite ends of the slot 50 is a perpendicular or radial slot 52 which defines with the slot 50 a pair of clamping sections 54 adjacent the upper end of the member 42. Carried by the clamp sections 54 and extending outwardly therefrom in spaced parallel relation are lugs 56 having aligned openings 58 extending therethrough. Annular recesses 60 lie concentric about the openings 58 and seated in said recesses 60 are annular collars carried by oppositely internally screw threaded nuts 62. Formed in the periphery of each nut 62 are circumferentially spaced notches 64, which, as illustrated in Figures 1 and 2, are adapted to receive the heads 66 of cap screws which are threadedly seated in the lugs 56.

Extending through the aligned openings 58 in the lugs 56 is a shaft or pin 68 carrying adjacent its opposite ends reversely pitched screw threads 70 and 72 which are adapted to threadedly engage the oppositely pitched screw threads in the nuts 62 so that when the shaft 68 is rotated the jaws 54 will be contracted or expanded according to the direction of rotation of the shaft. The threads 70 and 72 are essentially cams which serve to draw the lugs together and release them. It will be understood that a single cam or thread of fast lead will accomplish the same results.

Secured to the shaft 68, as by a tapered pin 74, is a barrel 76 carrying an outwardly extending lever arm 78 at the end of which remote from the barrel 76 is provided a knob 80 forming a handle by which the lever arm may be moved in an arcuate path adjacent the jaws 54.

In use it will be evident that by moving the handle or knob 80 in a vertical plane or arcuate path, the shaft 68 will rotate within the nuts 62 to release the contracting effort of the nuts 62 on the clamp sections or jaws 54 so as to enable the member 42 to be rotated about the column 18 to elevate the tool support 28 and disengage the teeth in the recess 38 from the teeth 22 of the base 20. This will enable the turret body 28 to be rotated or indexed about the column 18 to present a selected tool to the work. After the selection has been made the member 42 is rotated in a direction to lower the turret body 28 and re-engage the teeth in the recess 38 with the teeth 22 to lock the turret body 28 in the selected position. With the member 42 lowered and the turret firmly seated on the base 20 the handle 80 is again moved in a vertical plane or arcuate path to rotate the shaft 68 within the nuts 62 and contract the clamp sections 54 about the threaded end of the column 18. Obviously, by withdrawing the cap screws 66 from engagement with the nuts 62, the nuts may be rotated about the shaft 68 to select the degree of pressure to be exerted by the clamp sections 54 on the column 18, after which the screws are seated in the lugs 56 to engage adjacent notches in the nuts 62.

The locking and unlocking may be reversed by the user of the turret by transposing the positions of the nuts and reversing the adjusting screw or shaft, locking the turret when the handle is pushed up and unlocking it when down. This will be advantageous under certain machining conditions.

I claim:

1. In a tool holder of the turret type, the combination with a column provided with threads of relatively fast lead at its upper end and means for securing the same to a support, a turret body mounted for rotatable and axial movement on said column, means associated with said column and turret body for selectively interlocking said column and body; of a member rotatably attached to said turret body and provided with internal threads matching the threads on the column and provided with a transverse slot and an intersecting radial slot extending from the exterior of the member through the internal threads thereof, a plurality of lugs extending laterally from the upper portion of the member each spaced on opposite sides of said radial slot and at one side of the transverse slot, a pin rotatably mounted in said lugs and extending through the same, cam means carried by at least one end of the pin bearing against the adjacent face of at least one lug, and a handle positioned between the lugs and fast to the pin, whereby upon a movement of the handle in one direction the member will be clamped to the column and when moved in the opposite direction the member will be released for rotative movement about the column.

2. In a tool holder of the turret type, the combination with a column provided with threads of relatively fast lead at its upper end and means for securing the same to a support, a turret body mounted for rotatable and axial movement on said column, means associated with said column and turret body for selectively interlocking said column and body; of a member rotatably attached to said turret body and provided with internal threads matching the threads on the column and provided with a transverse slot and an intersecting radial slot extending from the exterior of the member through the internal threads thereof, a plurality of lugs extending laterally from the upper portion of the member each spaced on opposite sides of said radial slot and to one side of the transverse slot, a pin rotatably mounted in said lugs and extending through the same and having its opposite ends reversely threaded, a handle positioned between the lugs and fast to said pin, a complementary threaded nut for each threaded end of the pin bearing against the outer face of the adjacent lug, and means for locking said nuts in the desired operative positions.

3. In a tool holder of the turret type, the combination with a column provided with threads at its upper end and means for securing the same to a support, a turret body mounted for rotatable and axial movement on said column, means associated with said column and turret body for selectively interlocking said column and body; of a member rotatably attached to said turret body and provided with internal threads matching the threads on the column and provided with a transverse slot and an intersecting radial slot extending from the exterior of the member through the internal threads thereof, a plurality of lugs extending laterally from the upper portion of the member each spaced on opposite sides of said radial slot and to one side of the transverse slot, and a handle operatively connected to said lugs and movable in an arcuate path for moving the member into clamping engagement with said column.

4. In a tool holder of the turret type, the combination with a column provided with threads at its upper end and means for securing the same to a support, a turret body mounted for rotatable and axial movement on said column, means associated with said column and turret body for selectively interlocking said column and body; of a member rotatably attached to said turret body and provided with internal threads matching the threads on the column and provided with a transverse slot and an intersecting radial slot extending from the exterior of the member through the internal threads thereof, a plurality of lugs extending laterally from the upper portion of the member each spaced on opposite sides of said radial slot and to one side of the transverse slot, a shaft mounted in the lugs for rotation about its axis and operatively connected to the lugs for contracting the member upon movement about its axis in one direction, and a handle connected to said shaft for oscillating the same.

5. In a tool holder of the turret type, the combination with a column provided with threads at its upper end and means for securing the same to a support, a turret body mounted for rotatable and axial movement on said column, means associated with said column and turret body for selectively interlocking said column and body; of a member rotatably attached to said turret body and provided with internal threads matching the threads on the column and provided with a transverse slot and an intersecting radial slot extending from the exterior of the member through the internal threads thereof, a plurality of lugs extending laterally from the upper portion of the member each spaced on opposite sides of said radial slot and to one side of the transverse slot, a pin rotatably mounted in said lugs and extending through the same and having its opposite ends reversely threaded, a handle positioned between the lugs and fast to said pin, a complementary threaded nut for each threaded end of the pin bearing against the outer face of the adjacent lug and provided with peripheral notches, and means engageable with said notches for locking said nuts in the desired operative positions.

References Cited in the file of this patent

UNITED STATES PATENTS

| | | |
|---|---|---|
| 1,152,055 | Schellenbach | Aug. 31, 1915 |
| 1,236,200 | Miller | Aug. 7, 1917 |
| 1,331,322 | Connell | Feb. 17, 1920 |
| 1,367,615 | Malone | Feb. 8, 1921 |
| 1,446,829 | Burrell | Feb. 28, 1923 |
| 2,366,079 | Wilson | Dec. 26, 1944 |
| 2,531,198 | Buret | Nov. 21, 1950 |